United States Patent [19]

Estes et al.

[11] 4,108,218

[45] Aug. 22, 1978

[54] METHOD OF PREPARING A REACTION CHAMBER

[75] Inventors: John H. Estes, Wappingers Falls; Stanley Kravitz, Fishkill; John T. Brandenburg, Hopewell Junction, all of N.Y.

[73] Assignee: Texaco Inc., New York, N.Y.

[21] Appl. No.: 699,754

[22] Filed: Jun. 25, 1976

[51] Int. Cl.² .................. B65B 3/04; B01J 21/04; B01J 23/22
[52] U.S. Cl. ............................. 141/1; 252/461; 252/464; 252/467; 252/471; 252/477 R; 23/288 F
[58] Field of Search ............ 252/464, 477 R, 461, 252/463, 467, 471; 423/213.2, 213.5; 427/215, 216, 376 R, 376 A, 376 C; 141/1; 23/288 F

[56] References Cited

U.S. PATENT DOCUMENTS

| | | | |
|---|---|---|---|
| 1,806,588 | 5/1931 | Espig et al. | 427/215 |
| 2,415,878 | 2/1947 | Hale | 252/464 X |
| 3,025,132 | 3/1962 | Innes | 423/213.2 |
| 3,362,783 | 1/1968 | Leak | 252/477 R |
| 3,424,781 | 1/1969 | Capp et al. | 252/464 X |
| 3,507,813 | 4/1970 | Vrbaski | 252/464 |
| 3,963,645 | 6/1976 | Gelbein | 252/464 X |

Primary Examiner—W. J. Shine
Attorney, Agent, or Firm—Thomas H. Whaley; Carl G. Ries; Carl G. Seutter

[57] ABSTRACT

A novel reaction chamber includes a gravity-packed bed formed of an attenuated support medium bearing solidified fused-solid whereby the bed is formed into a matrix which is particularly useful as a catalytic conversion chamber, a muffler, etc.

7 Claims, 4 Drawing Figures

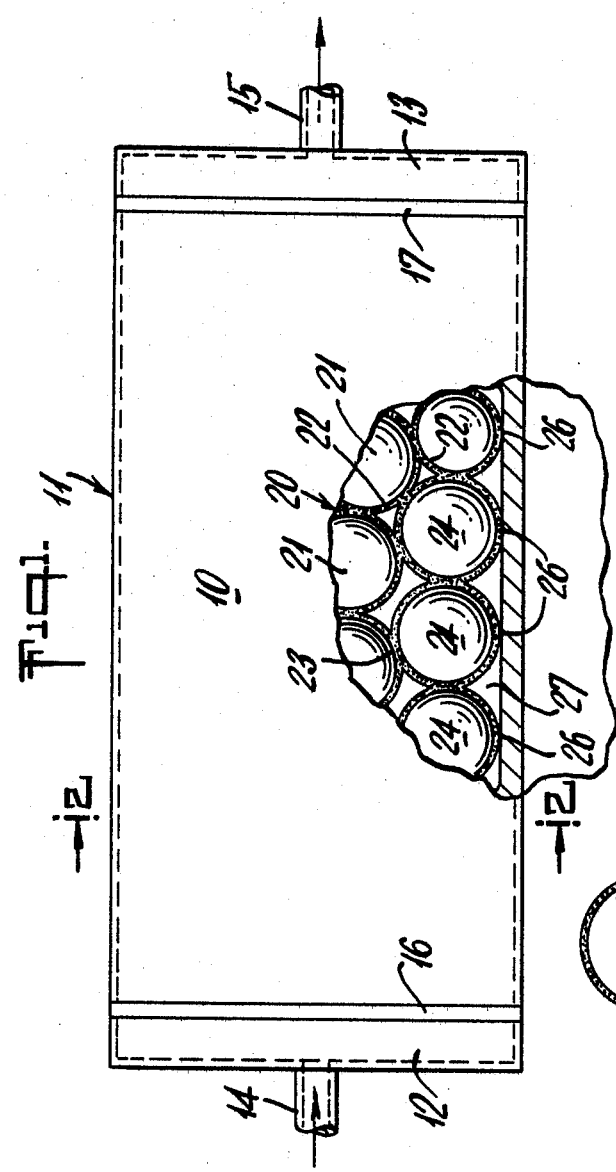
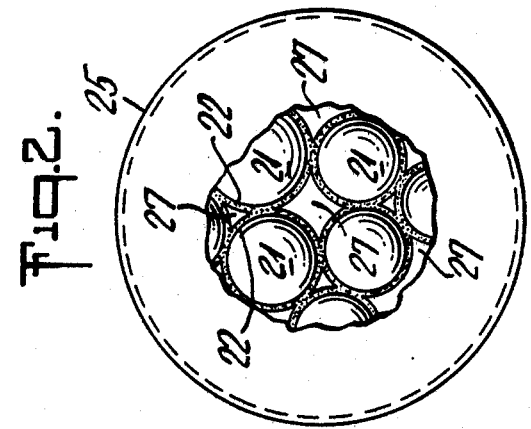
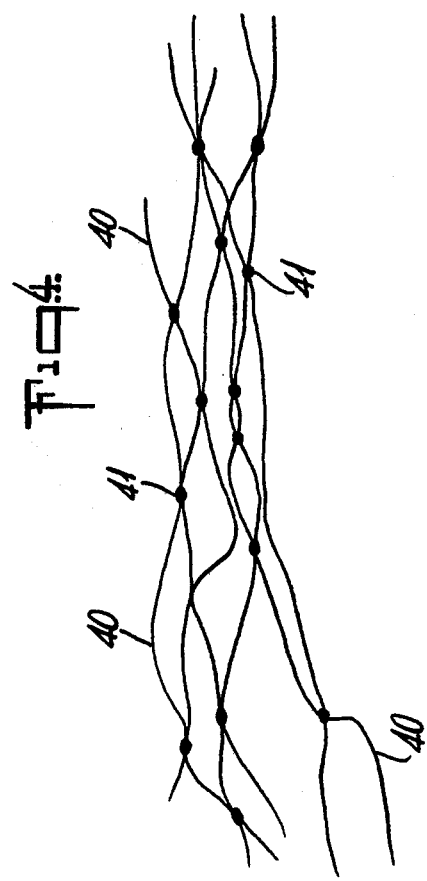
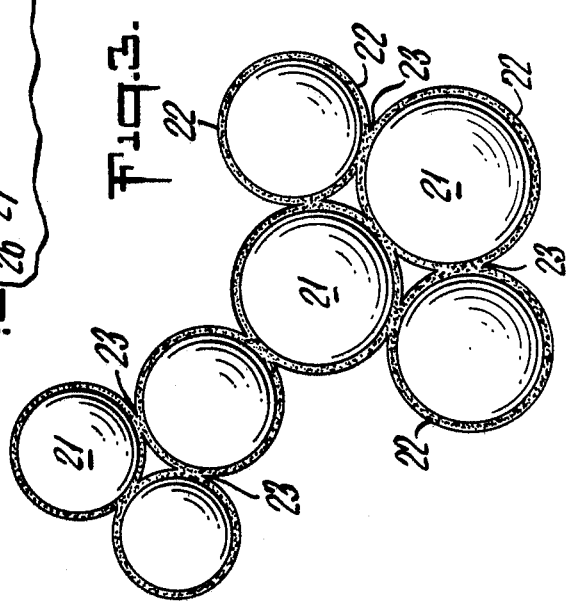

4,108,218

METHOD OF PREPARING A REACTION CHAMBER

FIELD OF THE INVENTION

This invention relates to a novel reaction chamber and to a method of making the reaction chamber. More particularly it relates to a muffler particularly adapted for use in connection with automotive engines.

BACKGROUND OF THE INVENTION

Reaction vessels which contain gravity-packed beds of catalyst may be used in a wide variety of applications. It is found that when the reaction vessel is subjected to various forces, such as vibratory or intermittent forces, the catalyst particles break down; and the charged particles (which are typically of 1-10 mm in average diameter) are converted to smaller particles — typically of diameter less than ca 1 mm. This formation of fines is undesirable for many reasons: (i) it may increase the pressure drop through the bed, (ii) it may permit segregation of the bed so that the fluid passing through the bed in fact may by-pass some or all of the catalyst particles, (iii) it may effectively block the active catalyst sites, (iv) it may permit loss of catalyst from the bed, etc.

In the case of a catalyst-packed muffler, these problems may be readily noticeable; and the vibration and the intermittent operation to which a muffler is subjected may accentuate these problems.

It is an object of this invention to provide a novel reaction chamber and a method of making the same. Other objects will be apparent to those skilled in the art.

STATEMENT OF THE INVENTION

In accordance with certain of its aspects, this invention is directed to a method of preparing an attenuated contact medium for use in a gravity-packed bed through which bed fluid passes as it contacts the surface of said contact medium at operating temperature which comprises (a) forming a mixture containing (i) a fluid suspending medium and (ii) a finely-divided solid which is fusible at temperature above said operating temperature and solid at temperature below said operating temperature;

(b) contacting said mixture and an attenuated support medium thereby uniformly coating said attenuated support medium with said finely-divided solid;

(c) heating said coated attenuated support medium to a temperature at least as high as the fusion temperature of said finely-divided solid whereby said finely divided solid fuses and forms a substantially continuous matrix within which the attenuated support medium is present as discontinuous phase; and (d) quiescently cooling said fused solid to temperature below its fusion temperature thereby forming a solidified matrix including a substantially continuous phase of said solidified fused-solid and a discontinuous phase of said attenuated support medium being positioned through the supporting matrix of said solidified fused solid.

DESCRIPTION OF THE INVENTION

The reaction chamber or vessel which may be prepared in practice of the process of this invention may be useful in a wide variety of catalytic processes. It may for example be used in hydrocarbon conversion processes typified by cracking, dealkylation, transalkylation, etc. or it may be used in treating processes typified by processes for treating stack gas, off-gas, exhaust gas, by-product gas, etc. Depending upon the nature of the process, the reaction chamber may handle various fluids which may be liquid or gas or mixtures thereof (including suspended solids).

The attenuated support medium which may be used in practice of the process of this invention may be a fibrous material such as metal fibre including steel wool, a mineral material such as blown asbestos fibre, a vitreous material such as fibre glass, etc. In a more preferred embodiment, the attenuated support medium may be particulate contact material in the form of spheres; extruded forms such as prisms, cylinders, etc; or randomly shaped particles. Illustrative specific particulate support media which may be employed may be alumina, silica-alumina, zeolites, pebbles, coke, gravel, broken glass, etc. Since a preferred support, because of cost considerations, is non-catalytic, it is possible to utilize waste materials such as certain spent catalysts or non-reclaimable zeolites or gravel or broken glass. It may however be preferred to use alumina spheres because of their ready availability, reproducibility, and reasonable cost.

The size of the attenuated support medium depends on the size of the reaction chamber. Typically when the reaction chamber is used in hydrocarbon conversion processes, the chamber may be as large as 4-5 meters in diameter. In this instance, the support medium, when particulate may include particles typically of 10-100, say 20-50 mm in diameter. In the preferred embodiment wherein the reaction chamber is a muffler of diameter of 2-50 cm, commonly 4-10 cm say 7-8 cm, the support medium when particulate may be 2-50 mm, commonly 4-10 mm say 7-8 mm in average diameter. Preferably the particulate support is of a more-or-less uniform size.

When the attenuated support medium is fibrous, as may be the case with eg steel wool, asbestos, fibreglass, etc, the average fibre may be 0.001-1 mm, say 0.01-0.05 mm in diameter and many diameters in length. Such materials may be used in the form of bats, pads, etc.

The attenuated support media which may be used in practice of the process of this invention are preferably such that when in place, they form a gravity-packed bed in which the portions of the medium are in contact with other portions of the medium. In the case of a steel wool bed, the steel wool is uniformly dispersed throughout the contact portion of the reaction chamber as a gravity-packed bed. In the case of pellets of eg alumina, the pellets touch and rest on each other; and in a preferred embodiment, they are positioned in a maximum density configuration.

The preferred self-supporting bed is one which permits ready passage of fluid therethrough. Commonly the bed may contain 50-95 volume % of empty space, preferably 70-92 volume %, say 90 volume % for the fibrous packings and about 50-55 v % for solids such as beads or pebbles. Fluid may traverse the bed by passage through these empty spaces between portions of the attenuated support media.

The beds of this invention are particularly characterized by desirable pre-fixed pressure drop which may be maintained over an extended period of time.

In practice of the process of this invention, the attenuated support medium is uniformly coated with a finely-divided solid. The bed may contain finely-divided solid, eg vanadia, in amount of 0.1-25 w %, preferably 1-18 w % say 13% of the total including support. It is a feature of this invention that the finely-divided solid is a catalyst for the reaction which is desirably effected as the reacting fluid subsequently passed through the formed gravity-packed bed. Clearly the nature of the catalyst is a function of the desired reaction.

The finely-divided solid is characterized by two criteria: (i) it is fusible at temperature above the temperature at which the reaction chamber will operate when the catalyst system is in place therein (so that the finely-divided solid will melt during installation) and (ii) it is solid at said operating temperature so that during operation it will not melt but will retain its structural rigidity. It will be understood that the melting point which is determinative may not be the measured melting point of the pure material as measured in the laboratory but rather the eutectic point of the material in situ. When the material includes more than one composition or when it reacts with the substrate, it may be lower than or higher than the theoretical melting point. When the material has a melting range rather than a single melting point, the lowest point of the melting range should be above the temperature of operation.

It is preferred that there be a differential of at least about 5° F and typically 5° F–25° F; i.e., the melting point or the lower limit of the melting range should preferably be at least about 5° F–25° F above the maximum contemplated operating temperature.

Illustrative finely-divided solids which may be employed include oxides of catalytic metals of Group V B, VI B, and VII B of the Periodic Table typified by oxides of vanadium, chromium, molybdenum, and manganese. The preferred oxide is that of vanadium i.e., vanadium pentoxide $V_2O_5$. It will be apparent to those skilled in the art that the term oxide includes, subject to the other conditions noted, compositions which form oxides in situ typified by: (i) mixtures of oxides such as a mixture of manganese dioxide $MnO_2$ and vanadium pentoxide $V_2O_5$; (ii) compounds which form oxides under the conditions of operation such as nickel carbonate or ammonium molybdate or ammonium vanadate; etc.

Typical finely-divided solids which may be employed include:
ammonium vanadate
ammonium molybdate
nickel carbonate
nickel ammonium carbonate More preferred finely-divided solids include the oxides:
vanadium pentoxide
molybdenum trioxide Although it is possible to utilize finely-divided solids which are soluble in the fluid suspending medium (when the latter is liquid) — typical of which may be ammonium molybdate which is water-soluble — it is preferred to utilize finely divided solids which are insoluble in the fluid suspending medium.

The fluid suspending medium may be gaseous or liquid. When it is a gas, it is preferably air, and the finely-divided solid is mixed with the gas to form a fluidized bed by means of which the mixture and the attenuated support medium are contacted. Specifically the fluidized finely divided solid, e.g. vanadia, may be passed through the gravity-packed bed as the solid is deposited on the attenuated contact or support medium.

In a preferred embodiment however, the fluid suspending medium is liquid and more preferably an aqueous liquid such as water. Other liquids including hydrocarbons such as benzene, kerosene, hexane, etc. may be employed. If the finely-divided solid is insoluble in the liquid, as is typically the case, the mixture may be in the form of a slurry containing 1–50, say 10–20, typically 15 parts of solid per 100 parts of liquid. If the solid is soluble in the liquid, the "mixture" may be in the form of a solution containing 1–30, preferably 5–10, say 10 parts of solute per 100 parts of solvent.

In a more preferred embodiment however, the mixture of fluid, suspending medium and finely-divided solid may be in the form of a paste containing 100–2000 parts, preferably 300–1000 parts, say 500 parts of solid per 100 parts of liquid, preferably water.

When the mixture is in the form of (i) a solution or (ii) a suspension in liquid or gas, the mixture may be contacted with the attenuated support medium while the latter is in the reaction chamber as a gravity-packed bed. The mixture is passed through the bed for time (typically 5–30 minutes, preferably 5–10 minutes, say 10 minutes) during which the finely divided solid is distributed throughout the entire bed. When the mixture is a solution, this time may be sufficient to permit adsorption of solution onto and into the preferably porous support medium.

Preferably however when the mixture is in the form of paste, the latter may be contacted with the support or contact medium by gently tumbling the latter in the presence of the former until uniform coverage of the support is attained. In one embodiment, this composition may then be added directly to the reaction chamber and the uniformly coated support medium further treated in situ. In another embodiment, further treating including heating of the composition may be effected prior to admission to the reaction chamber.

The coated, attenuated support, preferably maintained as a gravity-packed bed in which the various portions of support medium are in contact with each other to form a more-or-less continuous mass, preferably a gravity-packed bed of particles, is heated to a temperature at least as high as the fusion temperature of the finely-divided solid whereby the finely divided solid fuses and forms a continuous matrix within which the attenuated support medium is present as discontinuous phase. The mass is self-supporting in the preferred embodiment.

In a preferred embodiment wherein vanadium pentoxide is to be fused (from paste) to an alundum sphere, the temperature of operation is at least 1274° F which is the fusion temperature of the vanadia. Preferably the temperature is 1274° F–1350° F, say about 1300° F over the course of 0.01–100 hours, typically 2–60 hours, say 24 hours.

The fused solid is preferably cooled under quiescent conditions to a temperature below its fusion temperature thereby forming a substantially continuous phase of solidified fused-solid and a discontinuous phase of said attenuated support medium positioned uniformly through the supporting matrix of solidified fused solid. There is thus formed an agglomerate or matrix of desired composition.

The agglomerate or matrix of desired composition may be formed in unitary sizes which may be thereafter fitted into a reaction chamber, such as a muffler, or into a larger catalytic bed. In the latter instance, they may be randomly placed within the reaction chamber or they may be regularly placed. By this technique the pressure drop through the bed may be regulated.

In a preferred embodiment however, the matrix may be formed in situ in a reaction chamber; and this is particularly desirable when the reaction chamber is to be used as a muffler. In this instance, the contacting of (i) the attenuated support medium and (ii) the mixture of fluid suspending medium and finely-divided solid is preferably effected within the muffler in which the former has been placed. If contact is made external to the muffler, then the coated attenuated support is gently placed within the muffler. In this latter instance the support may be in the form of (i) one formed compact mass designed to fit the muffler, (ii) a plurality of formed compact masses which together are designed to fit the muffler, (iii) a plurality of agglomerates of particles, etc.

In either instance in the preferred embodiment, the muffler assembly containing the gravity-packed bed is preferably heated to a temperature at least as high as the fusion temperature of the finely-divided solid whereby the finely-divided solid fuses and forms a substantially continuous matrix within which the attenuated support medium is present as discontinuous phase. In the preferred embodiment, the fused finely-divided solid coheres to the walls of the reaction chamber of the muffler, so that on cooling the cooled mass is bonded both internally, each portion to an adjacent portion, and externally to the wall of the reaction chamber.

The reaction chamber so prepared is found to be particularly characterized by its low cost, high degree of catalytic activity, mechanical durability, controlled and unchanging pressure drop and generally satisfactory performance. When used as a muffler to treat engine exhaust gases (at eg 700° F–1000° F) it readily permits reaction of unburned hydrocarbon and carbon monoxide with added air to give innocuous products.

It is a feature of the catalyst bed of this invention when used in an automotive muffler system that it may be used without regeneration for a life which depending upon the nature of the driving, may be 25,000–50,000 miles.

Regeneration when required may be readily effected by passing through the catalyst bed an oxidizing regeneration gas, preferably air at a VHSV of 2–20, say 10 (based on the empty vessel) and 200° F–800° F, say 500° F for 2–10 hours, say 4 hours.

DESCRIPTION OF PREFERRED EMBODIMENTS

Practice of the process of this invention will be apparent to those skilled in the art from the following description of a preferred embodiment wherein, as elsewhere in this specification, all parts are parts by weight unless otherwise stated.

EXAMPLE I

In practice of the process according to a preferred embodiment of this invention, the attenuated support medium is 100 parts of alpha alumina spheres of 4–8 mm diameter. The spheres are added to a mixing vessel together with a paste formed from 100 parts of water, 10 parts of vanadium pentoxide of 50–100 microns average particle size, 5 parts of chromium oxide ($CrO_3$) of 50–100 $\mu$ average particle size, and 3 parts of iron oxide (FeO) of 50–100 $\mu$ average particle size.

The mixture is agitated by rotating the mixing vessel for 10 minutes during which time the paste uniformly coats the spheres. The so formed mixture is transferred to a muffler body, as shown in FIGS. 1 and 2 of the drawing. The muffler body 10 includes a catalyst section 11 and plenum chambers 12 and 13 at each end. In this embodiment, the muffler is intended to be used for automotive use and is generally cylindrical of 10 cm diameter and 25 cm in length. The muffler body 10 includes inlet conduit 14 and outlet conduit 15.

Within the muffler body, and defining the catalyst section 11 are foraminous catalyst supports 16 and 17 which serve several functions. They delineate the catalyst section 11 from the plenum chambers 12 and 13. They serve to define the limits of the catalyst bed within the muffler. They serve to uniformly direct the flow of fluid through the muffler body. As will be apparent to those skilled in the art, this representation is schematic. Preferably one of the supports, e.g. 17, may be secured in position when the main portion of the muffler body is fabricated. After the catalyst is in position, the other support, e.g. 16, may be positioned; and, e.g. the head or end portion of the muffler body secured in position. In another embodiment, one support may be omitted.

The spheres bearing the oxide coating are gently transferred to the muffler body wherein they form a gravity-packed bed filling the inside of the catalyst section 11. In the preferred embodiment, the bed rests on support 16 and completely fills the catalyst section 11 defined by that support and by the walls of the muffler body. The muffler assembly is then finally assembled — e.g. the support 17 is positioned if used and the head of the e.g. chamber adjacent to support 17 is fixed in place.

The muffler body and contained bed are heated in a furnace to 1300° F which is just above the melting point (1274° F) of the lowest melting component of the oxide mixture; and it is maintained at this temperature for 12 hours during which time the vanadium pentoxide melts and, by surface tension, covers the surface of the spheres and at least a portion of the inside of the shell of the muffler body 10 defining the catalyst section 11.

The muffler body 10 is then cooled to temperature below the fusion point of the eutectic component of the oxide system and the system thereafter gradually cooled over 12 hours to ambient temperature.

Inspection (as by cutting open a sample muffler) reveals that the catalyst bed 11 within the muffler body 10 is typified by the cross-section 20 of a portion of the system. It will be observed in section 20 that the alumina spheres 21 each bear a thin film 22 which encircles sphere 21 and which bonds each sphere 21 to at least one adjacent sphere 21 at a junction point 23 whereby the catalyst body is essentially a monolithic mass.

It will also be noted that the spheres 24 which are adjacent to wall section 25 are bonded to that wall section at wall junction points 26 — so that at least a portion and preferably the entire body of spheres is a monolithic mass bonded to the wall.

As may be observed from FIG. 2, which shows an expanded view of a portion of the catalyst section taken along line 2—2 of FIG. 1, the spheres bear the thin film 22 and the spheres meet at junction points 23 at which they are bonded together. FIG. 2 also shows that the more-or-less monolithic mass contains a plurality of passage ways 27 through which fluid may traverse the monolithic mass in the catalyst section.

In operation, the typical automotive muffler is used in connection with a standard automotive internal combustion gasoline engine. The exhaust gas from this engine, with no muffler, at 850° F, contains the following:

TABLE

| Component | Vol % |
| --- | --- |
| Unburned hydrocarbon | 200 ppm |
| Carbon Monoxide | 1.0 v % |
| Carbon Dioxide | 14.0 v % |
| Nitrogen Oxides | 700 ppm |
| oxygen | 0.8 v % |

During an experimental run over 3 hours, this exhaust gas is admitted to a muffler. Effluent gas from the muffler after 3 hours, at ca 850° F, may contain the following:

TABLE

| Component | Vol. % |
| --- | --- |
| Unburned hydrocarbon | 40 ppm |
| Carbon Monoxide | 0.2 v % |
| Carbon Dioxide | 14.8 v % |
| Nitrogen Oxides | 700 ppm |
| oxygen | 0.6 v % |

*based on empty muffler

By comparison of these two tables, it will be apparent that this muffler is highly satisfactory. Specifically the muffler reduces to satisfactory levels the content of unburned hydrocarbon, carbon monoxide, and nitrogen oxides.

After operation for ca 1000 hours, which corresponds to automotive operation for 50,000 miles, the catalyst section of the muffler is regenerated by placing the muffler in a furnace at 1000° F and passing air through the muffler for 24 hours. Thereafter the muffler may be found to possess 90 plus % of the effectivity which it had ab initio.

EXAMPLE II

In this embodiment it is found that results comparable to those achieved in Example I are attained. The procedure of Example I is followed except that the charge of alumina spheres coated with oxide (prior to firing) is divided into 500 gram portions and each is separately fired to above the fusion temperature. Thus there is formed a plurality of essentially monolithic configurations each of which may be about 2–3% of the total mass used in Example I.

These are placed within a muffler as a gravity packed bed (which is not thereafter fired); and the assembly used as in Example I.

It is found that the results are less satisfactory than those attained in Example I, but they still represent a substantial improvement. The technique of this Example may be preferred when it is desired to prepare the catalyst mass in a different location or at a different time than that of the final complete assembly, when it is not desired that the muffler (ex catalyst) be heated to the temperature of initial fusion, and/or when the ultimate requirements are such that the muffler is to meet less stringent environmental requirements etc.

EXAMPLE III

In the embodiment of this example, the procedure includes placing 100 parts of alpha alumina spheres of 4–8 mm diameter in a rotating kiln. There is then sprayed onto the rotating mass over 15 minutes, a slurry of 15 parts of 20- mesh vanadium pentoxide in 100 parts of water. In a drying portion of the kiln, operating at 250° F, the slurry evaporates and the vanadia coats the spheres. As they are coated, they move into a high temperature portion of the kiln (ca 1300° F) at which temperature the vanadia melts. As the mass slowly rotates (at eg 1–5 RPM), the particles in the mass agglomerate to form product agglomerates containing 2–10, say 5–7 particles per agglomerate. In a subsequent portion of the kiln, operating at 1200° F and less, the vanadia solidifies and bonds the agglomerates firmly together. Each cooled agglomerate includes a plurality of attenuated, spherical particles of support medium, each particle of which bears a surface layer of recrystallized, solidified vanadia; and it is found that each particle is bonded to at least one other particle by means of the resolidified vanadia. See FIG. 3.

The so-prepared agglomerates are gently packed within a reaction chamber in the form of a gravity-packed bed. If desired, the so prepared bed may be subjected to a further heating operation to temperature above the fusion temperature of the vanadia; and in this instance the aggregates or conglomerates become bonded to each other and the wall of the reaction chamber as in Example I.

EXAMPLE IV

In still another embodiment of this invention, the procedure includes filling a reaction chamber 4 inches in diameter and 6 inches in height with stainless steel wool pods each of which is made up of a plurality of essentially continuous fibres of ca 0.01 inch in diameter vanadium pentoxide powder (of average particle size of 50–100 microns) is blown into and over the steel wool with a stream of air which fluidizes the vanadia. When the reaction chamber contains about 15 parts of vanadia per 100 parts of steel wool, the flow of air is stopped.

The system is heated to 1300° F for 24 hours and then cooled to ambient temperature. It is found that the vanadia is present as a solidified fused solid which covers most if not all of the surfaces of the steel wool. In particular, it is found (qv FIG. 4) that the individual wires 40 bear a surface coating of the vanadia; and individual wires are bonded together at a plurality of points schematically indicated as 41. The vanadia forms a substantially continuous phase and the wire is a discontinuous phase.

The mass of steel wool bonded to the wall of the container is a rigid gravity-packed self supporting assembly.

Results comparable to those of Example I may be attained by use of this reaction chamber.

Although this invention has been illustrated by reference to specific embodiments, it will be apparent to those skilled in the art that various changes and modifications may be made which clearly fall within the scope of this invention.

We claim:

1. The method of preparing a reaction chamber containing particulate contact medium in a gravity-packed bed having at operating temperature a solid substantially continuous phase of cooled fused-solid and a discontinuous phase of said particulate support medium, the component portions of said particulate support medium being positioned substantially uniformly through the supporting matrix of said fused solid, said cooled matrix being bonded, internally each portion to an adjacent portion, and externally to the wall of said reaction chamber, through which bed fluid passes as it contacts the surface of said contact medium at operating temperature which comprises (a) forming a mixture containing (i) a fluid suspending medium and (ii) at least one finely-divided solid selected from the group consisting of oxides of a catalytic metal of Group V B, Group VI B, and Group VII B of the Periodic Table and compounds thermally decomposable to said oxide, which solid is fusible at temperature above said operating temperature and solid at said operating temperature;

(b) contacting said mixture and a particulate support medium thereby uniformly coating said particulate support medium with said finely-divided solid, said finely-divided solid being present in amount of a 0.1 w %–25 w % of the total of said finely-divided solid and said support medium;

(c) heating said coated particulate support medium, as a gravity-packed bed filling the inside of said reaction chamber and in contact with the walls thereof, to a temperature at least as high as the fusion temperature of said finely-divided solid whereby said finely-divided solid fuses and forms a substantially continuous matrix within which the particulate support medium is present as discontinuous phase; and (d) quiescently cooling said fused solid to temperature below its fusion temperature thereby forming a solidified matrix, occupying the interior of said chamber and substantially fixed therein, having at operating temperature a substantially continuous solid phase of said cooled fused-solid and a discontinuous phase of said particulate support medium, the component portions of said particulate support medium being positioned substantially uniformly through the supporting matrix of said fused solid, said cooled matrix being bonded, internally each portion to an adjacent portion, and externally to the wall of said reaction chamber.

2. The method of preparing a reaction chamber containing particulate contact medium in a gravity-packed bed having at operating temperature a solid substantially continuous phase of cooled fused-solid and a discontinuous phase of said particulate support medium, the component portions of said particulate support medium being positioned substantially uniformly through the supporting matrix of said fused solid, said cooled matrix being bonded, internally each portion to an adjacent portion, and externally to the wall of said reaction chamber, through which bed fluid passes as it contacts the surface of said contact medium at operating temperature as claimed in claim 1 which comprises (a) forming a mixture containing (i) water as suspending medium and (ii) finely-divided solid vanadium pentoxide which solid is fusible at temperature above said operating temperature and solid at said operating temperature;

(b) contacting said mixture and a particulate alumina support medium thereby uniformly coating said alumina support medium with said finely-divided solid, said finely-divided solid being present in amount of 0.1 w %–25 w % of the total of said finely-divided solid and said support medium;

(c) heating said coated particulate support medium, as a gravity-packed bed filling the inside of said reaction chamber and in contact with the walls thereof, to a temperature at least as high as the fusion temperature of said finely-divided solid whereby said finely-divided solid fuses and forms a substantially continuous matrix within which the alumina support medium is present as discontinuous phase; and (d) quiescently cooling said fused solid to temperature below its fusion temperature thereby forming a solidified matrix, occupying the interior of said chamber and substantially fixed therein, having at operating temperature a substantially continuous solid phase of said fused-solid and a discontinuous phase of said alumina support medium, the component portions of said support medium being positioned substantially uniformly through the supporting matrix of said fused solid, said cooled matrix being bonded, internally each portion to an adjacent portion, and externally to the wall of said reaction chamber.

3. The method of preparing a reaction chamber wherein a fluid reactant may be contacted with a solid contact material at operating temperature which comprises (a) forming a mixture consisting essentially of (i) a fluid suspending medium and (ii) a finely-divided solid selected from the group consisting of oxides of a catalytic metal of Group V B, Group VI B, and Group VII B of the Periodic Table and compounds thermally decomposable to said oxide, which solid is fusible at temperature above said operating temperature and solid at temperature below said operating temperature;

(b) contacting said mixture and a particulate support medium thereby uniformly coating said particulate support medium with said finely-divided solid, said finely-divided solid being present in amount of 0.1 w %–25 w % of the total of said finely-divided solid and said support medium;

(c) heating said coated particulate support medium as a gravity-packed bed filling the inside of said reaction chamber and in contact with the walls thereof, to a temperature at least as high as the fusion temperature of said finely-divided solid whereby said finely-divided solid fuses and forms a substantially continuous matrix within which the particulate support medium is present as discontinuous phase; and (d) quiescently cooling said fused solid to temperature below its fusion temperature thereby forming a solidified matrix, occupying the interior of said chamber and substantially fixed therein, having at operating temperature a substantially continuous solid phase of said fused-solid and a discontinuous phase of said particulate support medium, the component portions of said particulate support medium being positioned substantially uniformly through the supporting matrix of said fused solid, said cooled matrix being bonded, internally each portion to an adjacent portion, and externally to the wall of said reaction chamber.

4. The method of preparing a contact medium for use in a gravity packed bed through which bed fluid passes as it contacts the surface of said contact medium at operating temperature which comprises (a) forming a mixture containing (i) a fluid suspending medium and (ii) a finely-divided solid selected from the group consisting of oxides of a catalytic metal of Group V B, Group VI B, and Group VII B of the Periodic Table and compounds thermally decomposable to said oxide, which solid is fusible at temperature above said operating temperature and solid at temperature below said operating temperature;

(b) contacting said mixture and steel wool support medium thereby uniformly coating said steel wool support medium with said finely-divided solid, said finely-divided solid being present in amount of 0.1 w %–25 w % of the total of said finely-divided solid and said support medium;

(c) heating said coated support medium to a temperature at least as high as the fusion temperature of said finely-divide solid whereby said finely-divided solid fuses and forms a substantially continuous matrix within which the steel wool support medium is present as discontinuous phase; and (d) quiescently cooling said fused solid to temperature below its fusion temperature thereby forming a solidified matrix including at operating temperature a solid substantially continuous phase of said fused-solid and a discontinuous phase of said steel wool support medium being positioned through the supporting matrix of said fused solid.

5. A particulate contact medium characterized by its superficial porosity, by its retention of structural rigidity at operating temperature, by its predetermined high surface area, and by its ability to be used in a gravity-packed bed through which fluid passes at operating temperature as said fluid contacts the surface of said contact material which comprises a discontinuous phase of a plurality of associated particles of support medium having portions thereof essentially contiguous to other portions thereof and portions thereof not contiguous to other portions thereof; and a continuous solid phase at operating temperature of a fused-solid selected from the group consisting of oxides of a catalytic metal of Group V B, Group VI B, and Group VII B of the periodic Table and compounds thermally decomposable to said oxide, substantially covering the surface of said associated particles and bonding essentially contiguous portions thereof together in an essentially rigid cluster or matrix, said fused solid being present in amount of 0.1 w %–25 wt % of the total of said fused solid and said support medium.

6. A particulate contact medium characterized by its superficial porosity, by its retention of structural rigidity at operating temperature, by its predetermined high surface area, and by its ability to be used in a gravity-packed bed through which fluid passes at operating temperature as said fluid contacts the surface of said contact material which comprises a discontinuous phase of a plurality of associated spheres of alumina support medium having portions thereof essentially contiguous to other portions thereof and portions thereof not contiguous to other portions thereof; and a continuous solid phase at operating temperature of a fused-solid vanadium pentoxide substantially covering the surface of said associated spheres and bonding essentially contiguous portions thereof together in an essentially rigid cluster or matrix, said fused solid being present in amount of 0.1 w % – 25 w % of the total of said fused solid and said support medium.

7. A contact medium characterized by its superficial porosity, by its retention of structural rigidity at operating temperature, by its predetermined high surface area, and by its ability to be used in a gravity-packed bed through which fluid passes at operating temperature as said fluid contacts the surface of said contact material which comprises a discontinuous phase including a body of steel wool as support medium, having portions essentially contiguous to other portions thereof and portions not contiguous to other portions thereof, and a contiguous solid phase at operating temperature of fused-solid vanadium pentoxide substantially covering the surface of said support medium in said discontinuous phase and bonding contiguous portions thereof together in an essentially rigid matrix, said fused solid being present in amount of 0.1 w % – 25 w % of the total of said fused solid and said support medium.

* * * * *